May 22, 1956 — J. F. FOSTER — 2,746,228
COMB ATTACHMENT FOR COTTON STRIPPERS
Filed Feb. 1, 1954 — 2 Sheets-Sheet 1
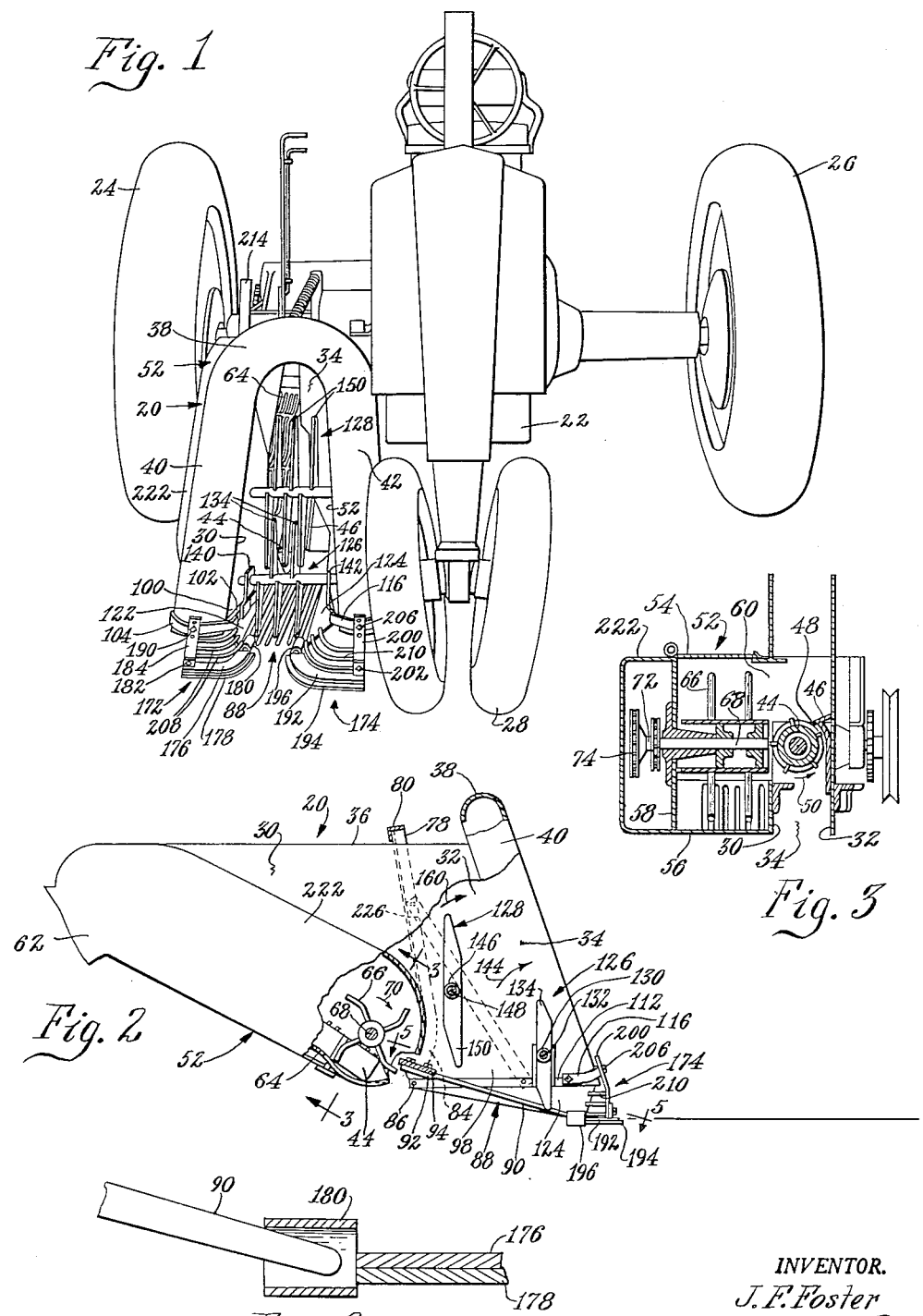

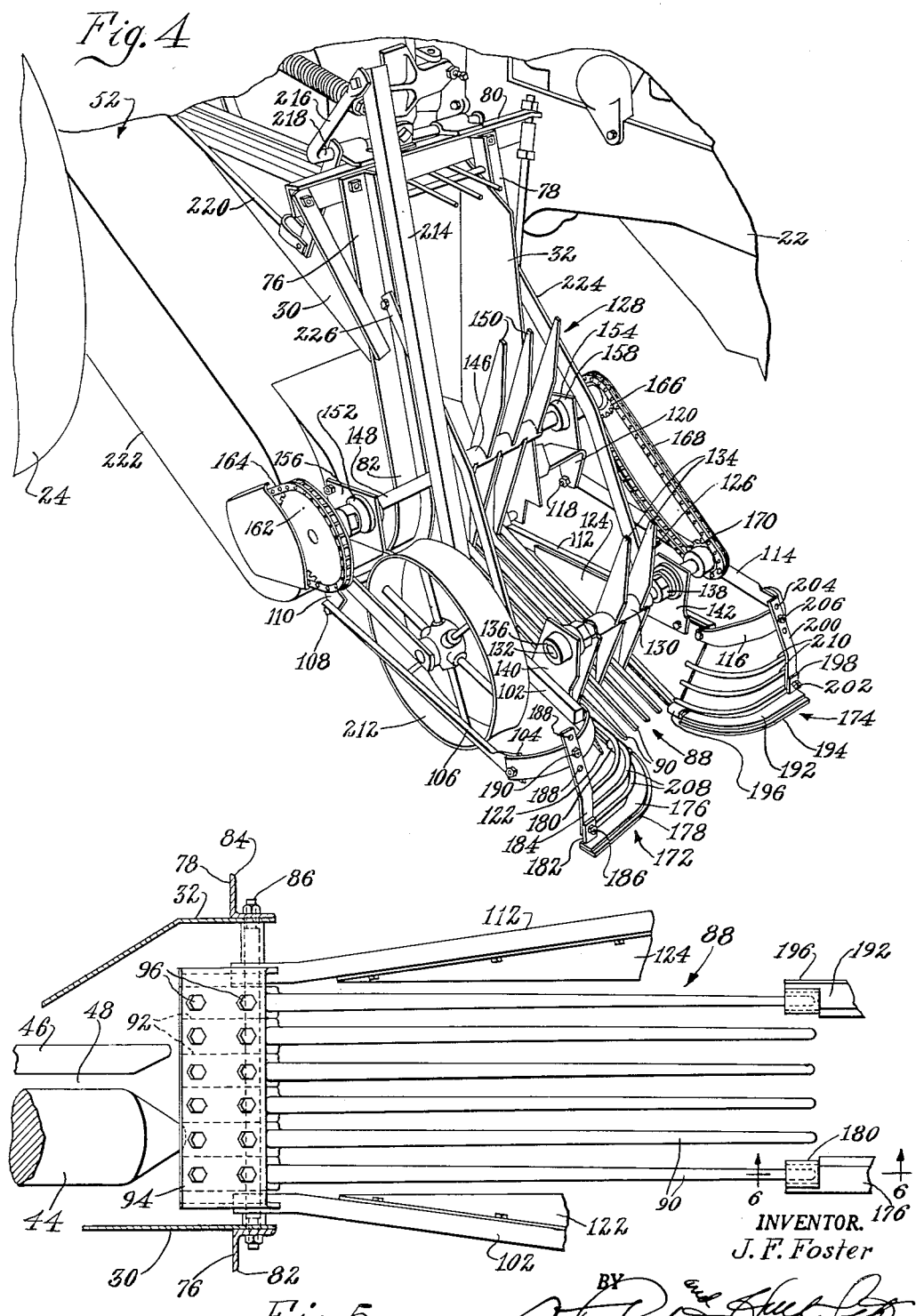

United States Patent Office 2,746,228
Patented May 22, 1956

2,746,228

COMB ATTACHMENT FOR COTTON STRIPPERS

Jack F. Foster, Moline, Ill., assignor to Deere & Company, Moline, Ill., a corporation of Illinois Application February 1, 1954, Serial No. 407,445

16 Claims. (Cl. 56—35)

This invention relates to a harvester and more particularly to a cotton harvester of the stripper type as distinguished from the picker type.

A typical cotton stripper includes a mobile frame, either tractor-drawn or self-propelled, on which is mounted one or more gathering units for collecting cotton from one or more rows of plants as the machine advances over the field. In the cotton-stripping operation, as distinguished from the cotton-picking method, ripe and unripe bolls alike are stripped from the plants rather than a selective plucking of cotton from open bolls as in the picking operation. Consequently, the stripper will include in its gathering mechanism some means for forcibly detaching the cotton bolls from the standing plants, leaving the plants denuded so that, one pass over the field is sufficient.

Cotton plants, through selection and breeding over the years, have been developed in a relatively wide variety of species especially adapted for planting in territories in which it is advantageous, for various reasons, to employ strippers instead of pickers. Such cotton is characterized in general by comparatively thick growth to a relatively low height as compared with cotton plants grown in areas suitable for operation of pickers. It very often happens that stripper cotton become especially dwarfed, growing at relatively low height and having bolls close to and at times even under the ground. This plant occurs in territories in which the climate is excessively dry and hot and the soil is of a somewhat sandy texture.

Cotton strippers are of several well known types: In one, the gathering means includes a rearwardly and upwardly extending longitudinal roll mounted for rotation alongside a fixed stripper bar so as to rotate in an upward direction adjacent to the stripper bar for forcibly detaching bolls that enter the narrow passage between the roll and the stripper bar; in another type of stripper, the gathering means is of the comb type comprising a plurality of longitudinally extending times arranged at a rearwardly and upwardly inclining angle and operative relatively close to the ground so that as the machine moves forwardly the plants and branches thereof are caused to pass between the tines and the tines will strip the bolls therefrom. It has been found that the roll-type machine, although more suitable in the majority of cases, loses some of its advantages in low cotton, whereas the comb-type shows to a disadvantage in taller cotton. In view of the fact that the roll-type machine has certain features of superiority over the comb-type, it is desirable to retain as many features thereof as is possible and yet to utilize to good advantage the beneficial features of the comb machine. Because of the great variety of cotton for which the machines must be designed, it is important that the roll-type machine be easily converted to a comb-type gatherer, primarily for use in low cotton. It is therefore one of the principal objects of the present invention to provide a comb attachment that may be readily mounted on and used with a roll-type machine.

It is a further feature of the invention that the attachment retains all of the fundamental characteristics of the roll-type machine, primarily that in which the roll naturally acts as a conveyor. The attachment is in the form of a grate or a plurality of tines mountable at the front of the machine, just ahead of the lower ends of the roll and stripper bar and effective to gather low cotton, while the roll and stripper bar retain their conveying characteristics as in the basic roll-type machine. Still another object of the invention is to utilize with the comb or grate attachment inner and outer guide means for increasing the efficiency of the machine in sandy and like soils. Other features of the invention include novel means for driving beaters associated with the attachment, novel means for mounting the guides for vertical adjustment, and various other features in combination and subcombination that will readily appear to those versed in the art as a preferred embodiment of the invention is disclosed in detail in the following description and accompanying sheets of drawings, the several figures of which are described briefly immediately below.

Fig. 1 is a front perspective view of a tractor-mounted stripper equipped with the comb and guide attachments.

Fig. 2 is a fragmentary side-elevational view, with portions broken away and shown in section, and drawn to a scale slightly smaller than that of Fig. 1.

Fig. 3 is an enlarged transverse sectional view taken on the line 3—3 of Fig. 2.

Fig. 4 is a perspective view of the right-hand front portion of the machine, omitting some of the external shielding and being drawn on a scale enlarged over that of Fig. 1.

Fig. 5 is an enlarged plan view, partly in section and drawn to a scale enlarged over that of Fig. 2, as seen substantially along the line 5—5 of Fig. 2.

Fig. 6 is a fragmentary sectional view on an enlarged scale as seen substantially along the line 6—6 of Fig. 5.

The cotton-stripper machine chosen for purposes of illustration is fundamentally like that in the U. S. Patent to Roscoe 2,533,510 and comprises cotton-gathering structure, denoted generally by the numeral 20, movable forwardly over a cotton field as an integral or mounted part of a conventional tractor shown here as including a longitudinal body 22 carried on relatively widely spaced rear traction wheels 24 and 26 and on a steerable front truck 28. The expressions "right-hand" and "left-hand" are used here with respect to those parts of the machine seen by an observer standing behind the machine and facing forwardly.

The cotton-gathering structure 20 is generally in the form of a housing having upright fore-and-aft extending side members or sheets 30 and 32 which between them define a relatively wide fore-and-aft extending plant throat 34. The side sheets are cross-connected at their upper edges by a longitudinally running top 36.

The forward portion of the gathering structure 20 is in the form of an arch or inverted U 38 having right- and left-hand leg portions 40 and 42 which respectively form continuations or merge with the side sheets or members 30 and 32. Each of these front portions is of arcuate section (Fig. 2) and the arch 38 defines the front or entry portion of the plant throat 34, the throat being centered on a row of cotton plants so that as the machine is driven forwardly the plants enter the plant throat 34 to be stripped by stripping mechanism here comprising a rearwardly and upwardly inclined stripping roll 44 and a fixed parallel stripper bar 46, the roll and bar 46 defining therebetween a relatively narrow restricted plant-receiving passage 48. In the operation of the machine as conventionally equipped, plants entering the throat 34 are caused to pass through or enter the stripping passage 48 between the roll 44 and stripper bar 46. The roll is positively driven so that it rotates in an upward direction alongside the bar 46 as indicated by the arrow 50 in Fig. 3. Cotton bolls stripped or detached from the plants are thus thrown to the right (to the left as seen in Fig. 3) into cotton-receiving means 52 comprising a housing positioned alongside the right-hand side sheet 30 of the gathering structure 20 and having upper and lower walls 54 and 56 and an outer wall 58. A portion of the side sheet or member 30 is open at 60 to enable the cotton to be propelled by the roll 44 into the means 52. This means is inclined upwardly and rearwardly and has a discharge end, designated here generally by the numeral 62, for ultimate transfer of the stripped coton to any suitable receptacle (not shown). The bottom 56 of the means 52 includes a sinuous grate 64 over which a plurality of wheels or beaters operate as in the above-noted patent to Roscoe. One of such beaters is shown at 66 in Figs. 2 and 3.

Each of the beaters 66 is mounted on a cross shaft 68 and these shafts may be driven in any suitable manner to rotate in the direction of the arrow 70 (Fig. 2). The source of power for the beaters 66 is disclosed in the Roscoe patent and is of no importance here, execept to establish the foremost beater shaft 68 as a power output member including a coaxial right-hand extension 72 to which is keyed a driving member or sprocket 74 (Fig. 3).

The forward portion of the gathering structure 20, just behind the sheet metal arch 38, includes upright right- and left-hand frame members 76 and 78, cross-connected at their tops by a transverse frame member 80. The right-hand frame member 76 has a lower portion 82 curved to fit the forward curved portion of the cotton-receiving means 52 and the lower portion of the left-hand frame member 78 is curved at 84 to achieve symmetry with the lower portion 82 of the member 76 so that the two portions are transversely alined to carry a transverse support or rod 86 for a comb attachment 88.

The comb attachment comprises a plurality of longitudinally extending tines or bars 90 affixed at their rear ends 92 to a transverse member 94 by a plurality of cap screws 96. The member 94 is appropriately mounted on the rod 86.

As best shown in Fig. 2, the member 94, and thus the rear ends 92 of the tines 90 of the comb attachment 88, is carried by the supporting structure 20 in a position proximate to and substantially at the level of the forward ends of the roll 44 and stripper bar 46. The tines extend thence forwardly and downwardly and are therefore adapted to strip low-growing bolls from plants as the machine advances. The bolls stripped by the tines 90 are caused to move rearwardly onto the roll 44 and, since they cannot fall through the restricted passage 48 between the roll 44 and bar 46, they are propelled by the roll to the right and through the opening 60 into the receiving means 52. Thus, when the machine is equipped with the comb attachment, the roll 44 has the function of conveying to the receiving means 52 bolls originally stripped by the comb attachment 88.

Each of the side sheets 30, 32 has a lower edge portion, represented by the numeral 98 for the side sheet 32 in Fig. 2, it being understood that the side sheet 30 has a symmetrically arranged portion visible generally at 100 in Fig. 1. These edge portions 98 and 100 run longitudinally and are transversely alined so as to occupy a level somewhat above the ground line (Fig. 2). The lower edge 100 adjoins and is preferably secured to a longitudinally running member 102. The member 102 is connected at its rear end to the transverse rod 86 (Fig. 5) and is connected at its forward end by a transverse arch or arcuate member 104 to the front end of a second brace member 106 that parallels the member 102. The rear end of the member 106 is supported by a pivotal connection 108 and bracket 110 secured to the front lower end of the receiving means 52. Symmetrical structure is provided at the opposite side of the comb attachment 88 and includes an inner fore-and-aft running member 112, an outer parallel member 114, an arcuate front connecting member 116 and a pivot 118 and bracket 120 for the rear end of the member 114. The rear end of the member 112 is supported on the transverse member or rod 86 (Fig. 5). The bracket 120 may be suitably supported at the lower end 84 of the left-hand upright member 78.

As indicated in Figs. 4 and 5, the members 102 and 112 diverge slightly toward the front and respectively include downwardly extending triangular sheets 122 and 124 having lower portions respectively adjoining the outermost tines 90 of the comb attachment. The triangular sheets 122 and 124 therefore complement the side sheets or members 30 and 32 and, because of their proximate relationship to the comb attachment 88, prevent lateral escape of bolls stripped by the comb attachment. Because of the grate-like nature of the comb attachment, stripped bolls cannot drop therethrough, but soil and other foreign matter can sift through the spaces between the tines before reaching the stripper roll 44. Hence, operation of the machine equipped with the comb attachment is just as clean as operation of the machine without the attachment, even though the tines 90 will at times run in part under ground to strip extremely low bolls which, as pointed out above, is a characteristic of "bumblebee" cotton.

Stripper harvesters are usually operated at a relatively high speed and the bolls are stripped in a veritable maelstrom of action, particularly in the lower forward portion of the throat 34. In order that stripped bolls may be prevented from escaping from the front or entry end of the throat 34, the comb attachment is supplemented by front and rear rotary elements 126 and 128. The front element 126 comprises a central hub 130 keyed to a cross shaft 132 and having a plurality of radial fingers 134. The shaft 132 is journaled at its opposite ends in suitable bearings 136 and 138 carried respectively in right- and left-hand laterally spaced mounting members or brackets 140 and 142. As best shown in Figs. 1 and 2, the lateral or axial spacing of the fingers 134 is such that the free or outer ends thereof run in the spaces between the tines, the fingers being of such radial length as to project slightly below the level of the tines as the rotor 126 rotates in the direction of the arrow 144 to sweep downwardly, then rearwardly and then upwardly relative to the roll 44 (Fig. 2).

The rear rotary element or rotor 128 comprises a central hub 146 keyed to a cross shaft 148 and having fixed thereto a plurality of radial axially spaced fingers 150. The cross shaft 148 is journaled respectively at its right- and left-hand ends in right- and left-hand bearings 152 and 154. These bearings are respectively carried in right- and left-hand mounting members or brackets 156 and 158, and the brackets are appropriately mounted on the forward portion of the supporting structure, as illustrated. The height of the shaft 148 and the length of the radial fingers 150 of the rotor 128 are such that as the rotor rotates in the direction of the arrow 160 (Fig. 2) the fingers do not pass between the tines but sweep downwardly, then rearwardly and then upwardly over the rear portions of the comb attachment, operating in conjunction with the forward rotor 126 to keep the stripped bolls moving rearwardly and upwardly onto the stripper roll 44.

The rotors 126 and 128 are driven from the drive means or power output members comprising the beater shaft 68 and output sprocket 74, previously described. For this purpose, the right-hand end of the rear rotor shaft 148 has keyed thereto a driven sprocket 162 and a chain 164 trained about this sprocket and the sprocket 74 establishes the drive connection. The left-hand end of the rear rotor shaft 148 has keyed thereto a sprocket 166 and a chain 168 is trained about this sprocket and about a sprocket 170 keyed to the left-hand end of the front rotor shaft 132. Although the particular drive mechanism just described is significant from the standpoint of facilitating the use of the comb means as an attachment, the rotors 126 and 128 could be driven from any other suitable source on the machine.

Another feature of the invention resides in right- and left-hand guide means 172 and 174, mounted respectively on forward portions of the right- and left-hand members of the gathering structure 20, for compelling widely spread, low growing bolls into the comb attachment 88.

The guide means or guide element 172 comprises a lower arcuate member 176 preferably equipped with a lower wear strip 178 and having at its inner end a sleeve portion 180 welded thereto and at its outer end an integral upstanding lug 182. As best shown in Figs. 5 and 6, the sleeve 180 loosely receives the free forward end portion of the right-hand outermost tine 90 and thus constitutes pivot means on a fore-and-aft axis for mounting the guide element 172 in part at least on the comb attachment. An upstanding support member 184 is pivotally connected at 186 to the lug 182 on the lower member 176 and adjacent its upper end has therein a plurality of apertures 188, any one of which may be selected for receiving a bolt 190 to connect the member 184 to the transverse front arcuate member 104 that joins the longitudinal lower members 102 and 106 previously described. Thus, the guide element 172 is carried in part on the comb attachment and in part on the front portion of the gathering structure 20 and the mounting means is such that the vertical position of the guide element may be adjusted relative to the structure 20.

The guide element 174 is symmetrically constructed, having a lower member 192, equipped with a wear strip 194, and provided at its inner end with a sleeve 196 and at its outer end with an integral upstanding lug 198. The sleeve 196 receives the free forward end of the left-hand outermost tine 90 and serves to mount the guide element 174 in part at least on the comb attachment 88. An upright support member 200, pivotally connected at 202 at its lower end to the lug 198, and having a plurality of apertures 204 at its upper end for selectively receiving an attaching bolt 206 to accomplish adjustable connection to the member 116, mounts the guide element 174 on the inner portion of the gathering structure 20. Because of the adjustability afforded at 188—190 and 204—206, the guide elements 172 and 174 may be selectively vertically adjusted, the fore-and-aft pivots at 90—180 and 90—196 enabling this result, which is further contributed to by the pivotal connections 186 and 202. In this respect, it should be noted that the members 104 and 116 relatively tightly embrace the arcuate or curved section of the portions 40 and 42 of the arched member 38 and consequently the guide elements 172 and 174, apart from their adjustment, are relatively fixed. Also, since the comb structure or attachment 88 is carried by the fixed guide elements 172 and 174, the comb will not have pivotal movement about the transverse connection 86. Therefore, the relationship between the comb attachment and the rotors 126 and 128 will not change.

The guide element 172 is augmented by a plurality of inwardly and rearwardly curved rods 208, each of which is rigidly secured at its outer end to the support member 184, as by welding, and each of which has a free inner end proximate to or adjoining the front portion of the triangular side sheet 122. Similar rods 210 are carried on the left-hand support member 200 and are similarly arranged relative to the left-hand triangular sheet 124.

The guide elements therefore give the effect of grilles and, when the machine is operating in loose or sandy soil, the lower portions of the guide elements will run partly under ground, but the guide elements will not accumulate soil, since the soil will pass freely between the spaced arcuate rods. The spacing of the rods is such that bolls cannot escape but will be compelled into the comb attachment 88.

Incidental to the basic structure of the machine is a gauge wheel 212 for gauging the height of the gathering structure relative to the ground. This gauge wheel can be adjusted by a vertical link 214 connected at its upper end to an arm 216 of a transverse rockshaft 218, power for operation of which is obtained from any suitable source on the tractor by means of a fore-and-aft extending link 220. The drive mechanism for the various beaters, such as that shown at 66, is enclosed within a shield 222 overlying the outer wall 58 of the cotton receiving means 52. These details, like those above in connection with the gauge wheel and its adjustment, are adequately shown in the above-identified Roscoe patent and form no part of the present invention, being described merely because they are illustrated as part of the basic machine.

The support of the lower members 102 and 106 and 112 and 114 is augmented by a pair of downwardly and forwardly inclining braces 224 and 226. These braces are connected at their upper ends respectively to the upright frame members 76 and 78 and are connected at their lower ends respectively to the inner fore-and-aft members 102 and 112.

Installation of the attachment structure just described is preceded, of course, by the removal from the basic machine of certain grate structure ahead of the roll 44 and stripper bar 46, but this is accomplished by the removal of merely a few bolts. The attachment structure is just as easily mounted by the installation of a few bolts to secure the supporting parts in place. In short, the attachment structure is designed to facilitate its use on the basic machine without materially modifying the machine. Other features of the invention not categorically enumerated herein will undoubtedly occur to those versed in the art, as will numerous modifications and alterations in the preferred embodiment of the invention disclosed, all of which may be made without a departure from the spirit and scope of the invention.

What is claimed is:

1. In a cotton stripper: cotton-gathering structure movable forwardly over a cotton field and including laterally spaced, generally upright and fore-and-aft extending side members defining between them a relatively wide fore-and-aft extending plant throat, said side members having lower portions at a level spaced slightly above the ground and transversely alined front portions defining the front end of the plant throat, and fore-and-aft stripper means carried between the side sheets and having a front entry end spaced rearwardly of the front portions of the side members and at substantially the level of the lower portions of the side members; comb means between the side members at the front and lower portions thereof and including a pair of fore-and-aft outer tines lying respectively inwardly of and proximate to the side members and other fore-and-aft tines intermediate said outer tines, all of said tines having rear ends fixed to the gathering structure in proximity to and at substantially the level of the front end of the stripper means, said tines extending forwardly and downwardly and having free front ends at about ground level and generally transversely alined with the front portions of the side members; a pair of guide elements, one for each side member and extending rearwardly and inwardly toward the comb from the front portion of the associated side member and occupying the space between the ground and the lower portion of said side member; a pair of first means respectively mounting the guide elements on the front ends of the outer tines, each first means including a pivot on a fore-and-aft axis; and a pair of second means respectively mounting the guide elements on the front portions of the side members, each second means including cooperative parts selectively vertically adjustable to enable vertical adjustment of the associated guide element about its aforesaid pivot.

2. The invention defined in claim 1, in which: each of the first means comprises a fore-and-aft sleeve rigid on its guide element and loosely receiving the front end of the associated outer tine to provide the aforesaid pivot.

3. The invention defined in claim 1, in which: each guide element comprises a support member and a plurality of rods connected to the support member to afford a grille-like structure.

4. The invention defined in claim 1, in which: the front portion of each side sheet is of arcuate section about an upright axis, said section being curved forwardly and laterally outwardly from the throat to afford smooth cotton entry to the throat, and each guide element is arcuate generally on the order of the section of the associated side member front portion.

5. In a cotton stripper: cotton-gathering structure movable forwardly over a cotton field and including laterally spaced, generally upright and fore-and-aft extending side members defining between them a relatively wide fore-and-aft extending plant throat, said side members having lower portions at a level spaced slightly above the ground and transversely alined front portions defining the front end of the plant throat, and fore-and-aft stripper means carried between the side sheets and having a front entry end spaced rearwardly of the front portions of the side members and at substantially the level of the lower portions of the side members; comb means between the side members at the front and lower portions thereof and including a plurality of fore-and-aft extending tines having rear ends fixed to the gathering structure in proximity to and at substantially the level of the front end of the stripper means, said tines extending forwardly and downwardly and having free front ends at about ground level and generally transversely alined with the front portions of the side members; a pair of guide elements, one for each side member and extending rearwardly and inwardly toward the comb from the front portion of the associated side member and occupying the space between the ground and the lower portion of said side member; a pair of first means respectively mounting the guide elements on the front ends of proximate tines; and a pair of second means respectively mounting the guide elements on the front portions of the side members.

6. The invention defined in claim 5, in which: each guide element comprises a support member and a plurality of rods connected to the support member to afford a grille-like structure.

7. The invention defined in claim 5, in which: the front portion of each side sheet is of arcuate section about an upright axis, said section being curved forwardly and laterally outwardly from the throat to afford smooth cotton entry to the throat, and each guide element is arcuate generally on the order of the section of the associated side member front portion.

8. The invention defined in claim 5, in which: the front portion of each side sheet is of arcuate section about an upright axis, said section being curved forwardly and laterally outwardly from the throat to afford smooth cotton entry to the throat, and each guide element comprises an arcuate base member curved on the order of the section of the associated side member front portion and having an inner end mounted on the front end of the proximate tine, said base member curving laterally outwardly and forward to an outer end ahead of said associated side member front portion, an upright support member secured to and rising from said outer end of the base member and connected to said associated side member front portion, and a plurality of generally horizontal arcuate rods secured to the support member and curving laterally inwardly and rearwardly toward the comb means.

9. In a cotton stripper: cotton-gathering structure movable forwardly over a cotton field and including laterally spaced, generally upright and fore-and-aft extending side members defining between them a relatively wide fore-and-aft extending plant throat, said side members having lower portions at a level spaced slightly above the ground and transversely alined front portions defining the front end of the plant throat, a pair of fore-and-aft strippers carried between the side members and lying closely side by side to define a laterally restricted stripping passage materially narrower than the plant throat, said strippers having transversely alined front ends spaced rearwardly of the front portions of the side members and substantially at the level of the lower portions of the side members, one of the strippers being rotatable on a fore-and-aft axis and cooperative with the other stripper to detach cotton from received plants and to cause such detached cotton to move laterally, receiving means carried by the gathering structure alongside the strippers to receive detached cotton, and drive mechanism on the gathering structure for driving the rotatable stripper and having a power output member; a comb attachment bridging the plant throat between the front portions of the side members and including a transverse support secured to the gathering structure at substantially the level of and proximate to the front ends of the strippers and a plurality of fore-and-aft tines having rear ends secured to the support and free forward ends at about ground level and ahead of said front ends of the strippers; a pair of laterally spaced apart rear mounting members secured to the gathering structure at opposite sides of the comb and including rear bearings coaxial on a transverse axis above and just ahead of the rear ends of the tines; a rear rotary element journaled in the rear bearings for rotation between the side members; a pair of laterally spaced apart front mounting members secured to the gathering structure and including front bearings coaxial on a transverse axis above and just rearwardly of the forward ends of the tines; a front rotary element journaled in the front bearings for rotation above the comb; and drive means connected to the aforesaid power output member and to the rotary elements and arranged to drive the elements in such direction that they sweep rearwardly over their respectively proximate portions of the tines.

10. The invention defined in claim 9, in which: the front rotary element comprises a central hub portion and radial fingers carried by the hub portion in such axially spaced relation and of such radial length as to pass between the tines during rotation thereof.

11. In a cotton stripper: cotton-gathering structure movable forwardly over a cotton field and including laterally spaced, generally upright and fore-and-aft extending side members defining between them a relatively wide fore-and-aft extending plant throat, said side members having lower portions at a level spaced slightly above the ground and transversely alined front portions defining the front end of the plant throat, a pair of fore-and-aft strippers carried between the side members and lying closely side by side to define a laterally restricted stripping passage materially narrower than the plant throat, said strippers having transversely alined front ends spaced rearwardly of the front portions of the side members and substantially at the level of the lower portions of the side members, one of the strippers being rotatable on a fore-and-aft axis and cooperative with the other stripper to detach cotton from received plants and to cause such detached cotton to move laterally, receiving means carried by the gathering structure alongside the strippers to receive detached cotton, and drive mechanism on the gathering structure for driving the rotatable stripper and having a power output member; a comb attachment bridging the plant throat between the front portions of the side members and including a transverse support secured to the gathering structure at substantially the level of and proximate to the front ends of the strippers and a plurality of fore-and-aft tines having rear ends secured to the support and free forward ends at about ground level and ahead of said front ends of the strippers; a pair of laterally spaced apart mounting members secured to the gathering structure at opposite sides of the comb and including bearings coaxial on a transverse axis above and intermediate the ends of the tines; a rotary element journaled in the bearings for rotation between the side members; and drive means connected to the aforesaid power output member and to the rotary element and arranged to drive the element in such direction that it sweeps rearwardly over the tines.

12. The invention defined in claim 11, in which: the rotary element comprises a central hub portion and radial fingers carried by the hub portion in such axially spaced relation and of such radial length as to pass between the tines during rotation thereof.

13. In a cotton stripper: cotton-gathering structure movable forwardly over a cotton field and including laterally spaced, generally upright and fore-and-aft extending side members defining between them a relatively wide fore-and-aft extending plant throat, said side members having lower portions at a level spaced slightly above the ground and transversely alined front portions defining the front end of the plant throat, and drive mechanism on the gathering structure having a power output member; a comb attachment bridging the plant throat between the front portions of the side members and including a transverse support secured to the gathering structure at substantially the level of the lower portions of the side members and rearwardly of the front ends of the side members and a plurality of fore-and-aft tines having rear ends secured to the support and free forward ends at about ground level and substantially transversely alined with the front ends of the side members; a pair of laterally spaced apart rear mounting members secured to the gathering structure at opposite sides of the comb and including rear bearings coaxial on a transverse axis above and just ahead of the rear ends of the tines; a rear rotary element journaled in the rear bearings for rotation between the side members; a pair of laterally spaced apart front mounting members secured to the gathering structure and including front bearings coaxial on a transverse axis above and just rearwardly of the forward ends of the tines; a front rotary element journaled in the front bearings for rotation above the comb; and drive means connected to the aforesaid power output member and to the rotary elements and arranged to drive the elements in such direction that they sweep rearwardly over their respectively proximate portions of the tines.

14. The invention defined in claim 13, in which: the front rotary element comprises a central hub portion and radial fingers carried by the hub portion in such axially spaced relation and of such radial length as to pass between the tines during rotation thereof.

15. The invention defined in claim 5, including: a pair of complementing side sheets, one for each guide element and associated side member, each complementing sheet being substantially coextensive with the proximate outer tine of the comb and filling the space between said tine and the lower portion of the associated side member rearwardly of the associated guide means.

16. In a cotton stripper: cotton-gathering structure movable forwardly over a cotton field and including laterally spaced, generally upright and fore-and-aft extending side members defining between them a relatively wide fore-and-aft extending plant throat, said side members having lower portions at a level spaced slightly above the ground and transversely alined front portions defining the front end of the plant throat, and fore-and-aft stripper means carried between the side sheets and having a front entry end spaced rearwardly of the front portions of the side members and at substantially the level of the lower portions of the side members; comb structure between the side members at the front and lower portions thereof and including a plurality of fore-and-aft extending tines having rear ends fixed to the gathering structure in proximity to and at substantially the level of the front end of the stripper means, said tines extending forwardly and downwardly and having free front ends at about ground level and generally transversely alined with the front portions of the side members; a pair of guide elements, one for each side member and extending rearwardly and inwardly toward the comb from the front portion of the associated side member and occupying the space between the ground and the lower portion of said side member, each guide element being of perforate nature so as to permit soil to sift therethrough during operation of the cotton stripper; and a pair of mounting means respectively mounting the guide elements on one of the structures.

References Cited in the file of this patent

UNITED STATES PATENTS

| | | |
|---|---|---|
| 1,789,803 | Boone | Jan. 20, 1931 |
| 1,926,338 | Johnston | Sept. 12, 1933 |
| 1,978,888 | Thomann | Oct. 30, 1934 |
| 2,406,058 | Boone | Aug. 20, 1936 |
| 2,445,162 | Wallace | July 13, 1948 |
| 2,491,777 | Smith | Dec. 20, 1949 |
| 2,517,063 | Wallace | Aug. 1, 1950 |
| 2,533,510 | Roscoe | Dec. 12, 1950 |
| 2,544,411 | Altgelt | Mar. 6, 1951 |
| 2,616,236 | Hartley | Nov. 4, 1952 |
| 2,664,686 | Witt | Jan. 5, 1954 |